United States Patent [19]

Matsuyama et al.

[11] 4,025,726
[45] May 24, 1977

[54] CATHODE GATE TRIGGERING METHOD AND SYSTEM FOR SPEECH PATH SWITCHES

[75] Inventors: Mitsuo Matsuyama, Yokohama; Shinzi Okuhara, Fujisawa, both of Japan

[73] Assignee: Hitachi, Ltd., Japan

[22] Filed: Dec. 16, 1975

[21] Appl. No.: 641,298

[30] Foreign Application Priority Data

Dec. 20, 1974  Japan .......................... 49-145568

[52] U.S. Cl. ........................ 179/18 GF; 340/166 R
[51] Int. Cl.² ........................................ H04Q 3/52
[58] Field of Search .................. 179/18 GF, 18 GE; 340/166 R

[56] References Cited
UNITED STATES PATENTS

| | | | |
|---|---|---|---|
| 3,688,051 | 8/1972 | Aagaard | 179/18 GF |
| 3,786,425 | 1/1974 | Hetherington et al. | 340/166 R |
| 3,864,530 | 2/1975 | Hestad | 179/18 GE |

Primary Examiner—Thomas A. Robinson
Attorney, Agent, or Firm—Craig & Antonelli

[57] ABSTRACT

A cathode gate triggering method and system for speech path channel switches using $m \times n$ PNPN switches as switching elements, in which $l \times n$ PNPN switches in each switch array connected in common at the anode thereof are connected in multiple at the control gate thereof to substantially a single control gate common line through respective diodes, and a single constant-current regulated power supply capable of switching the output current thereof by being controlled by an external control source is connected to this control gate common line for supplying constant current to the control gate of each of the PNPN switches, so that uniform gate current can be supplied to each of the multiple connection stages, and each of the PNPN switches can be triggered in a stable and reliable manner.

13 Claims, 7 Drawing Figures

CATHODE GATE TRIGGERING METHOD AND SYSTEM FOR SPEECH PATH SWITCHES

This invention relates to speech path switches incorporated in communication systems such as automatic telephone exchange systems, and more particularly to a gate triggering method and system for a speech path switch of the kind using PNPN switches as switching elements.

In a conventional automatic telephone exchange system, the ringing signal (audible bell signal), speech current, dial pulses, charging signal and other required signals are applied to necessary equipment through a speech path switch, for example, a mechanical contact type switch represented generally by a crossbar switch. With the development of an electronic exchange system, however, all the peripheral control circuits provided for the control of the speech path switch have already been replaced by electronic circuits, and it has been strongly demanded to realize a speech channel switch consisting of electronic elements too for the purposes of further reducing the overall volume of the exchange system, improving the operating performance of the exchange system, reducing the equipment cost, etc.

An attempt was made in the past for realizing such a speech path switch by using gas discharge tubes as the switching elements thereof. With the recent progress of the semiconductor industry, especially the progress of the integrated circuit technique, it has become possible to realize a semiconductor speech path switch. Especially, a PNPN switch is considered to be most suitable for use as the switching element of such a semiconductor speech path switch. A plurality of PNPN switches are generally arranged in matrix form to constitute the speech path switch. When m PNPN switches and n PNPN switches are arranged to form a matrix consisting of $m \times n$ PNPN switches, it is necessary to provide a PNPN switch triggering circuit for each of the intersections of the $m \times n$ PNPN switches, that is, these PNPN switch triggering circuits are required in the number which is equal to that of the PNPN switches. However, when the switch array consisting of $1 \times n$ PNPN switches in common connected at the anode thereof is noted, a calling subscriber is connected to a called subscriber by one signal input route and one signal output route in the switch array, and thus, only one switching element is necessarily turned on in such a case among the $1 \times n$ PNPN switches in this switch array. Therefore, only one triggering circuit is necessary for the switch array consisting of the $1 \times n$ PNPN switches. This method is advantageous over the method of providing one triggering circuit for each intersection of the PNPN switches from the viewpoints of economy, ease of attainment of desired control, etc.

It is to be noted herein that the scale of the switch array consisting of the $1 \times n$ PNPN switches associated with one triggering circuit, hence, the value of n is selected to be most suitable from the standpoints of switch mounting and system construction.

Although the triggering method above described is useful and effective, it is still defective in that the number of connectable stages of speech path switches using PNPN switches is limited and cannot be increased beyond a limited value.

It is therefore an object of the present invention to provide a novel and improved gate triggering method and system according to which speech path switches using PNPN switches as switching elements can be connected over multiple stages more than hitherto.

Another object of the present invention is to provide a method and system of the kind above described according to which the path switches can be easily controlled in spite of the fact that the number of triggering circuits is considerably less than hitherto.

Still another object of the present invention is to provide a gate triggering circuit for speech path switches, capable of controlling gate triggering current in response to variations of a minimum gate-triggering current of PNPN switches due to its temperature characteristic variations in production.

Further object of the present invention is to provide a gate triggering circuit for speech path switches, capable of effectively triggering PNPN switches by low electric power.

The present invention provides a gate triggering method and system for speech path switches using $m \times n$ PNPN switches as switching elements, in which $1 \times n$ PNPN switches in each switch array connected in common at the anode thereof are connected in multiple at the control gate thereof to substantially a single control line through respective diodes, and a single constant-current regulated power supply whose output current can be switched under control of an external control source is connected to this control line for supplying a constant current to the control gate of each of the PNPN switches.

The above and other objects, features and advantages of the present invention will become apparent from the following detailed description taken in conjunction with the accompanying drawings, in which.

A prior art speech path switch structure using PNPN switches as switching elements for establishing speech paths and a prior art gate triggering method applied to such speech path switches will be described with reference to FIGS. 1 and 2 respectively, before describing preferred embodiments of the present invention in detail.

Figure 1:
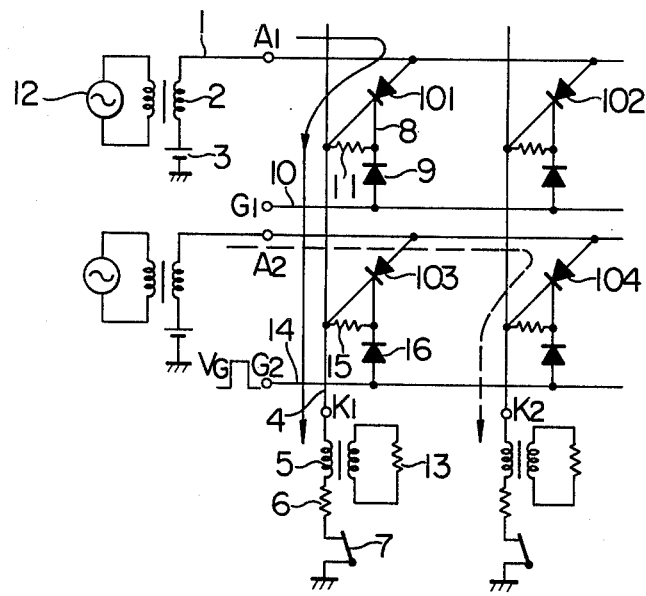
FIG. 1 shows diagrammatically one basic form of a prior art speech path switch structure using PNPN switches as switching elements for establishing speech paths.

FIG. 1 shows a model to illustrate how speech channels are established by a prior art speech path switch structure consisting of four PNPN switches 101 to 104 arranged to form a matrix of two by two switches.

Referring to FIG. 1, an anode common line 1 connects the anode of the PNPN switches 101 and 102 to a common dc power source 3 through a terminal $A_1$ and a transformer 2. An arrangement similar to that above described is provided for the PNPN switches 103 and 104. A cathode common line 4 connects the cathode of the PNPN switches 101 and 103 to the ground through a terminal $K_1$, a transformer 5, a current setting resistor 6 and a current on-off switch 7. An arrangement similar to that above described is provided for the PNPN switches 102 and 104. The control gate 8 of the PNPN switch 101 is connected through a diode 9 to a control gate common line 10 which is connected to a first gate control input terminal $G_1$. The diode 9 is provided for preventing flow of reverse current from the cathode of the PNPN switch 101. A resistor 11 is connected between the cathode and the control gate 8 of the PNPN switch 101 to prevent mal-firing of the PNPN switch 101 due to the rate effect. Similarly, the control gate of the PNPN switch 103 is connected through a diode 16 to a second gate control input terminal $G_2$ by a control gate common line 14, and another resistor 15 is associated with the PNPN switch 103. The control gates of the PNPN switches 102 and 104 are similarly connected to the respective terminals $G_1$ and $G_2$.

When now the switch 7 is turned on to apply dc voltage of the dc power source 3 across the anode and cathode of the PNPN switch 102 which is not conducting, a positive potential and a potential approximately equal to the ground potential appear at the anode and cathode respectively of the PNPN switch 101. Then, when a control pulse is applied to the gate control input terminal $G_1$ connected to the control gate of the PNPN switch 101 by the control gate common line 10, gate current flows from the control gate toward the cathode of the PNPN switch 101 to turn on the PNPN switch 101, and dc current flows in a direction shown by the solid arrow. Once the PNPN switch 101 is turned on, it holds itself to permit continuous flow of the current until the switch 7 is turned off although the control pulse applied has disappeared at this time. Therefore, a signal generated from a signal source 12 corresponding to a handset of a calling subscriber passes through the transformer 2 to be superposed on the dc current supplied from the dc power source 3, and such signal passes then through the PNPN switch 101 and transformer 5 to be transmitted to a load 13 corresponding to a handset of a called subscriber. At this time, the cathode potential $V_K(on)$ of the PNPN switch 101 in the conducting state is raised up to a level close to the anode potential of the PNPN switch 101, since the forward voltage drop across the PNPN switch 101 after turned on or in the conducting state is small.

Consider then the case in which the PNPN switch 104 is turned on to establish a speech path as shown by the dotted arrow. In this case, a gate control pulse voltage $V_G$ applied to the control gate of the PNPN switch 104 through the control gate common line 14 must be lower than the cathode potential $V_K(on)$ above described, so that the PNPN switch 103 may not be mal-fired or undesirable noise current may not appear in the already established speech channel shown by the solid arrow. During the turn-on of the PNPN switch 104, reverse current may flow from the line 4 into the line 14 through the resistor 15 connected to the PNPN switch 103, but this undesirable reverse current flow can be prevented by the diode 16. A plurality of matrices each having an arrangement as shown in FIG. 1 are connected over a plurality of stages for switching operation.

Figure 2:
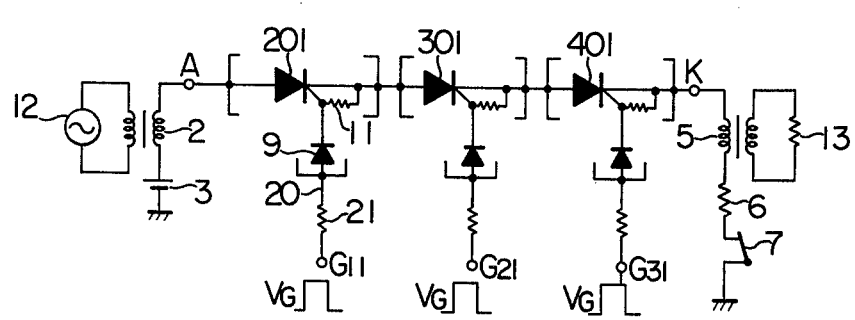
FIG. 2 shows diagrammatically one basic manner of triggering such path switches according to a prior art method.

FIG. 2 shows a model to illustrate how speech paths are established by a prior art switching system including three path switches connected in cascade. Three PNPN switches 201, 301 and 401 shown in FIG. 2 represent respectively one of PNPN switches in individual path switches each having a structure as shown in FIG. 1. Thus a plurality of other PNPN switches (not shown) are connected in matrix form to the anode and cathode of each of the illustrated PNPN switches 201, 301 and 401.

Referring to FIG. 2, the control gate of the PNPN switches 201 is connected through a diode 9 to a control gate common line 20 which is common to the PNPN switches connected in common at the anode thereof in the same matrix. This control gate common line 20 is connected through a gate current setting resistor 21 to a gate control input terminal $G_{11}$ to which a gate control pulse voltage $V_G$ is applied. Similar arrangements are provided for the remaining PNPN switches 301 and 401.

When now the gate control pulse voltage $V_G$ is applied simultaneously to the PNPN switches 201, 301 and 401 arranged over the three stages, the PNPN switch 401 disposed in the last stage and having a cathode potential close to the ground potential is initially turned on, and then, the PNPN switches 301 and 201 are turned on in this order to complete a speech path. The voltage value of the gate control pulse voltage $V_G$ and the resistance value of the resistors 21 will now be discussed.

A forward voltage drop of 1 to 1.5 volts occurs in the PNPN switches in the conducting state. The cathode potential of the PNPN switch 201 in the first stage remotest from the PNPN switch 401 in the last stage is highest, and a highest potential is required for turning on this PNPN switch 201. Therefore, the voltage value of the gate control pulse voltage $V_G$ must be sufficiently large such that the PNPN switch 201 in the first stage can be reliably turned on by overcoming the voltage drop across the resistor 21 due to the flow of gate current. On the other hand, the voltage applied to the control gate common line 20 through the gate control input terminal $G_{11}$ must be lower than the cathode potential of the PNPN switch 201 in the conducting stage in order to prevent flow of noise current through another speech path already established or to avoid mal-firing of non-conducting ones of the PNPN switches as described previously. This requirement must also be satisfied in the PNPN switch 401 in the last stage where the cathode potential is lowest. Further, due to the fact that the cathode potentials of the PNPN switches 201, 301 and 401 in the respective stages differ from each other by the amount corresponding to the forward voltage drop across each of the PNPN switches, the voltage value of the gate control pulse voltage $V_G$ and the resistance value of the resistor 21 in each stage must be selected so that the gate current supplied to the PNPN switch 201 in the first stage may not be smaller than required and that supplied to the PNPN switch 401 in the last stage may not become excessively larger than required.

These three conditions are contradictory to one another, and an attempt to satisfy all these contradictory conditions at the same time is not successful in the case in which it is desired to increase the number of path switches to more than that illustrated in FIG. 2. It has therefore been difficult to connect the channel switches over four to eight stages to obtain a switching system of large capacity or it has been necessary in such a case to apply gate control pulse voltages of different values to the respective stages and to select different resistance values for the resistors 21 in the respective stages.

It will be seen from the above description that, in the prior art gate triggering method applied to the speech path switches of the kind using PNPN switches as switching elements, gate currents of different values must be supplied through resistors of different settings for the gate control by applying gate control pulse voltages of different values to the respective stages when the channel switches are connected over many stages. The prior art gate triggering method has therefore been technically as well as economically defective in that difficulty is encountered in connecting the speech path switches over many stages, and an unnecessary increase of parts of different characteristics and an undesirable increase of the designing period of time are inevitable due to the different design conditions required for the individual stages.

With a view to obviate the prior art defects pointed out above, the present invention contemplates the provision of a novel and improved gate triggering method and system of the kind above described according to which such speech path switches can be connected over many stages without any practical difficulty and a constant gate current can be supplied to each of these stages.

Figure 3:
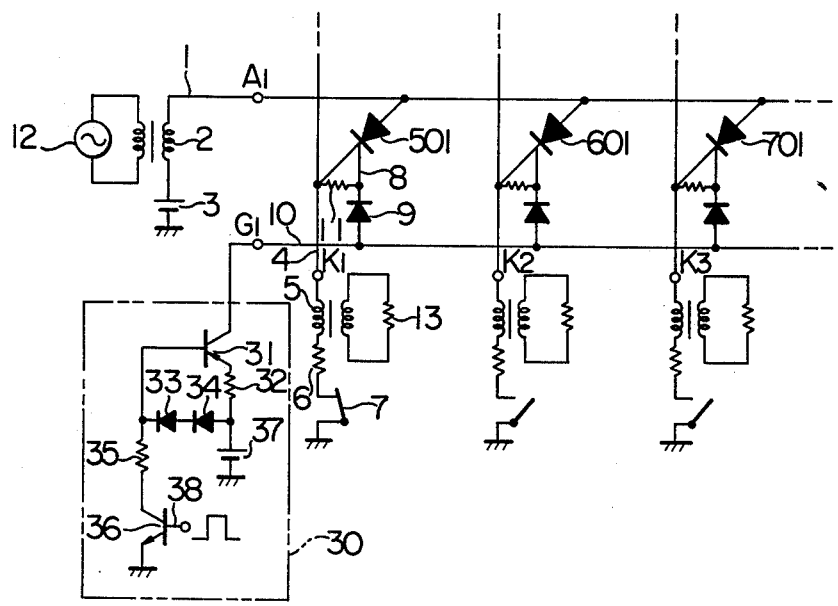
FIG. 3 is a circuit diagram of an embodiment of the gate triggering system of the present invention.

FIG. 3 shows a first embodiment of the speech path switch gate triggering system according to the present invention. In FIG. 3, three PNPN switches 501, 601 and 701 connected in common at the anode thereof are shown to avoid confusion of illustration.

Referring to FIG. 3, an anode common line 1 connects the anode of the PNPN switches 501, 601 and 701 to a common dc power source 3 through a first anode terminal $A_1$ and a transformer 2. A cathode common line 4 connects the cathode of the PNPN switch 501 to ground through a first cathode terminal $K_1$, a transformer 5, a current setting resistor 6 and a current on-off switch 7. The cathode of the remaining PNPN switches 601 and 701 is similarly grounded.

The PNPN switches 501, 601 and 701 are connected at the control gate 8 thereof in multiple to a single control gate common line 10 through respective diodes 9. This control gate common line 10 is connected through a first gate control input terminal $G_1$ to a constant-current regulated power supply 30. This constant-current regulated power supply 30 is composed of a current supplying transistor 31, a gate current setting resistor 32, a pair of voltage clamping diodes 33 and 34, a current limiting resistor 35, a control transistor 36, and a d.c. power source 37. A resistor 11 is connected across the cathode and cathode gate 8 of each of the PNPN switches 501, 601 and 701.

In operation, the switch 7 associated with the PNPN switch 501 is turned on to apply the d.c. power source voltage across the anode and cathode of the PNPN switch 501 when it is desired to turn on this PNPN switch 501. Then, a control pulse voltage having a waveform as shown is applied to the base 38 of the control transistor 36 to turn on the same. As a result, base current is supplied to the base of the transistor 31 to turn on the same. Since at this time, voltage applied across the resistor 32 is clamped at a constant level by the clamping diodes 33 and 34, emitter current of the transistor 31 is maintained constant, and therefore, collector current of this transistor 31 is maintained at a constant value which is the product of the constant emitter current value and the current amplification factor of the transistor of grounded-base configuration. This collector current of the transistor 31 flows toward the cathode of the PNPN switch 501 through the control gate common line 10, reverse flow preventive diode 9 and resistor 11. As soon as the voltage drop across the resistor 11 exceeds the forward saturation voltage of the pn junction between the cathode gate 8 and the cathode of the PNPN switch 501, gate current flows into the cathode gate 8 of the PNPN switch 501 to turn on the same.

The base potential of the transistor 31 is determined by the voltage setting of the d.c. power source 37 and by the voltage clamping level of the diodes 33 and 34. Thus, when the voltage setting of the d.c. power source 37 is selected so that the base potential of the transistor 31 is lower than the cathode potential of the PNPN switch 501 in the conducting state, there is utterly no possibility of supplying noise current to already established speech channels or mal-firing anyone of the nonconducting PNPN switches. Therefore, the number of connectable stages can be increased to the value obtained by dividing the difference between the cathode potential of the PNPN switch in the conducting state and that in the non-conducting stage by the forward voltage drop across the PNPN switch. Further, the gate current can be maintained uniform in all the stages.

FIGS. 4 to 7 show other forms or modifications of the constant-current regulated power supply employed in the path switch gate triggering system according to the present invention.

Figure 4:
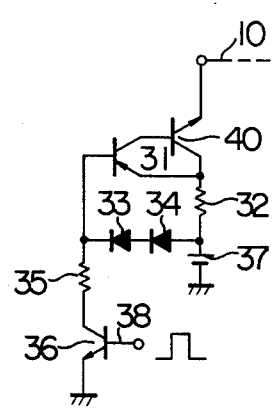
FIGS. 4 to 7 are circuit diagrams of part of other embodiments of the present invention.

In the modification shown in FIG. 4, an npn transistor 40 is added to the constant-current regulated power supply 30 shown in FIG. 3. The operation of the modification shown in FIG. 4 is entirely similar to that of the constant-current regulated power supply 30 described with reference to FIG. 3. In the modification shown in FIG. 4, however, the transistors 31 and 40 disposed in the output stage are connected to constitute the Darlington connection. This arrangement is effective especially when this power supply is constructed in an integrated circuit form, because, in such a case, the pnp transistor 31 has a lateral structure and the current amplification factor thereof cannot be increased beyond a certain limit.

Figure 5:
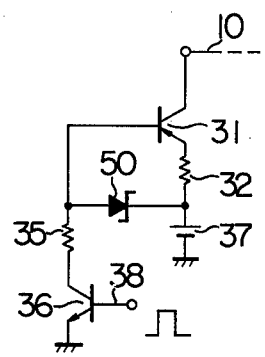

In the modification shown in FIG. 5, the diodes 33 and 34 in the constant-current regulated power supply 30 shown in FIG. 3 are replaced by a voltage regulator diode 50. The operation of the modification shown in FIG. 5 is entirely similar to that of the constant-current regulated power supply 30 described with reference to FIG. 3. However, the modification shown in FIG. 5 is featured by the fact that only one diode is required for voltage clamping.

Figure 6:
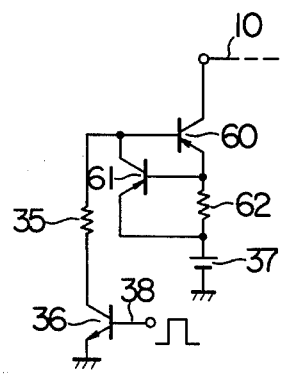

In the modification shown in FIG. 6, the transistor 31, resistor 32, and diodes 33 and 34 in the constant-current regulated power supply 30 shown in FIG. 3 are replaced by a pair of transistors 60 and 61 and a resistor 62. In the modification shown in FIG. 6, the transistor 61 is connected across the base and emitter of the output transistor 60 so that collector current of the transistor 61 can be increased and decreased depending on the increase and decrease of collector output current of the transistor 60 thereby maintaining constant the collector output current of the output transistor 60. Therefore, current flowing through the resistor 62 is substantially equal to the collector output current of the output transistor 60 when the current amplification factor of the transistor 60 is selected to be approximately equal to that of the transistor 61.

Figure 7:
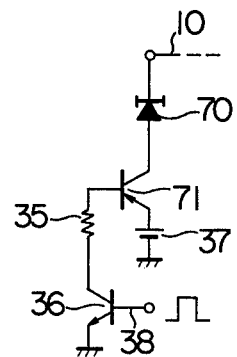

In the modification shown in FIG. 7, the transistor 31, resistor 32, and diodes 33 and 34 in the constant-current regulated power supply 30 shown in FIG. 3 are replaced by a current regulator diode 70 and a transistor 71. The operation of the modification shown in FIG. 7 is such that, in response to the application of a control pulse to the base 38 of the transistor 36, the transistors 36 and 71 are turned on, and the current regulator diode 70 conducts to supply a constant current to the control gate common line 10 connected to the control gate of the PNPN switches. A constant gate current can be supplied to the control gate of each of the PNPN switches in anyone of the multiple connection stages, since the current value flowing through the current regulator diode 70 can be maintained constant irrespective of the magnitude of voltage applied thereacross.

It will be understood from the foregoing detailed description that, in the speech path switch gate triggering method and system according to the present invention, 1 × n PNPN switches in each switch array connected in common at the anode thereof are connected in multiple at the control gate thereof to a single control gate common line through respective diodes, and a single constant-current regulated power supply whose output current can be switched under control of an external control source is connected to this control gate common line for supplying a constant gate current to the control gate of each of the PNPN switches. Thus, the triggering operation can be carried out stably and reliably compared with the prior art manner of triggering with a constant voltage. Such stable and reliable operation can be carried out due to the fact that the gate current supplied to each of many stages is uniform. Further, the speech path switch gate triggering system of the present invention based on the method above described can be easily designed and manufactured, and it is possible to eliminate an unnecessary increase of parts of different characteristics and an undesirable increase of the period of time required for designing.

Further, due to the fact that the gate triggering circuit according to the present invention is connected in common to the intersections of n PNPN switches, the number of such circuits is considerably less than hitherto, and these circuits can be integrated together with the PNPN switches without appreciably increasing the manufacturing cost.

Furthermore, when the constant-current regulated power supply shown in FIGS. 3 and 4 is formed into a semiconductor integrated circuit device, the undermentioned effect is produced. Referring to FIG. 3, assuming that a gate-triggering current is $I_{gt}$, the collector current of the transistor 31 can be estimated by the following equation (1):

$$I_{gt} \simeq \frac{V_{FD3} + V_{FD4} - V_{BE}}{R_2} \cdot \alpha_1 \qquad (1)$$

where
$V_{FD3}$, $V_{FD4}$ = forward voltage drops of diodes 33 and 34, respectively
$V_{BEQ}$ = forward voltage drop between the base and emitter of transistor 31
$\alpha_1$ = grounded-base connection current amplification factor of transistor 31
$R_2$ = resistance value of resistor 32
Incidentally, the minimum gate-triggering current $I_{gt}$ min of PNPN switch 501 connected with the resistor 11 becomes $$I_{gt} \text{ min} \simeq \frac{V_{gk}}{R_1} \qquad (2)$$

where
$V_{gk}$ = voltage drop between the gate and cathode of PNPN switch 501
$R_1$ = resistance value of the resistor 11
When the constant-current regulated power supply shown in FIG. 3 is similarly formed into a semi-conductor integrated circuit device, the following relationship can be realized:

$$V_{FD3} \simeq V_{FD4} \simeq V_{BEQ} \simeq V_{gk} = V_F \qquad (3)$$

where $V_F \approx 0.7$ V for silicon substrate Accordingly, substituting the relationship (3) into the equation (1)

$$I_{gt} \simeq \frac{V_F}{R_2} \cdot \alpha_1 \qquad (1')$$

Substituting $\alpha_1 \simeq 1$ into (1')

$$I_{gt} \simeq \frac{V_F}{R_2} \qquad (1'')$$

The equation (1'') means that the gate-triggering current $I_{gt}$ in the triggering circuit is determined by the forward voltage drop of the diode and the resistor just like the minimum gate-triggering current $I_{gt}$ min of PNPN switches determined by the equation (2).

With use of the semiconductor circuit integration, it is feasible to keep small variations of the resistance ratios or the forward voltage drop ratios of diodes within one chip. And then the diodes 33 and 34 in the foregoing embodiment may be substituted by PN junctions of transistors utilized as a two-terminal element and also the number of diodes may be any quantity not less than two pieces.

As mentioned above, when the gate-triggering circuit of speech path switches shown in FIGS. 3 and 4 according to the present invention is formed into a semiconductor integrated circuit device, the resistance value of the resistor 32 for setting gate current $I_{gt}$ may be determined by including a very small margin for covering the variations of the grounded-base connection current amplification factor $\alpha_1$ of the transistor 31, and then as the gate-triggering current of PNPN switches can be regulated in response to the variations of the minimum gate-triggering current due to the temperature characteristic thereof, similarly it is not necessary to determine the gate-triggering current by including a margin for covering the variations of the minimum gate-triggering current.

What is claimed is:

1. A gate triggering method for a speech path switch using m × n PNPN switches as switching elements arranged in a matrix form in which each row of PNPN switch arrays constituted of n PNPN switches are connected in common at the anode thereof, comprising the steps of:
   a. connecting the 1 × n PNPN switches constituting each said row array in multiple at the cathode gates thereof to substantially a single control gate common line through respective diodes;
   b. connecting said control gate common line to a single constant-current regulated power supply capable of switching the output current thereof by being controlled by an external control source; and c. supplying a constant current from said constant-current regulated power supply to the cathode gate of each PNPN switch for triggering the same.

2. A gate triggering circuit for a speech path switch using $m \times n$ PNPN switches as switching elements in which $1 \times n$ PNPN switches constituting each row of PNPN switch arrays are connected in common to an incoming line at the anode thereof, comprising:

means for connecting said $1 \times n$ PNPN switches constituting each row of said array in multiple at the cathode gates thereof to a single control gate common line through respective diodes; and a single constant-current regulated power supply connected to each control gate common line respectively, said constant-current regulated power supply being capable of switching the output current thereof by being controlled by an external control source.

3. A speech path switch gate triggering circuit as claimed in claim 2, wherein said constant-current regulated power supply comprises a first transistor and a second transistor,
a first resistor and a second resistor,
a first diode and a second diode, and
a DC power source,
said first transistor having its emitter connected to ground through a series connection of said first resistor and said DC power source, and having its base connected by way of said second resistor to the collector of said second transistor and connected to the series connection point of said first resistor and said DC power source through a series connection of said first and second diodes, and having its collector connected to said control gate common line which is connected to the cathode gates of said PNPN switches, and
said second transistor having its emitter connected to ground, and having its base connected to said external control source.

4. A speech path switch gate triggering circuit as claimed in claim 3, wherein the base potential of said first transistor is selected to be lower than the cathode potential of said PNPN switches in the conducting state of the latter.

5. A speech path switch gate triggering circuit as claimed in claim 3, wherein said first transistor is effectively formed of a pair of Darlington-connection transistors.

6. A speech path switch gate triggering circuit as claimed in claim 3, wherein said constant-current regulated power supply comprises a first transistor and a second transistor,
a first resistor and a second resistor,
a voltage regulator diode, and
a DC power source,
said first transistor having its emitter connected to ground through a series connection of said first resistor and said DC power source, and having its base connected by way of said second resistor to the collector of said second transistor and connected to the series connection point of said first resistor and said DC power source through said voltage regulator diode, and having its collector connected to said control gate common line which is connected to the cathode gates of said PNPN switches, and said second transistor having its emitter connected to ground, and having its base connected to said external control source.

7. A speech path switch gate triggering circuit as claimed in claim 2, wherein said constant-current regulated power supply comprises a first transistor, a second transistor and a third transistor,
a first resistor and a second resistor, and
a DC power source,
said first transistor having its emitter connected to ground through a series connection of said first resistor and said DC power source, having its base connected to the collector of said second transistor through said second resistor, and having its collector connected said control gate common line which is connected to the cathode gates of said PNPN switches,
said second transistor having its emitter connected to ground, and having its base connected to said external control source, and
said third transistor having its collector and base connected to the base and emitter of said first transistor, respectively, and having its emitter connected to the series connection point of said first resistor and said DC power source.

8. A speech path switch gate triggering circuit as claimed in claim 2, wherein said constant-current regulated power supply comprises a first transistor and a second transistor,
a resistor,
a current regulator diode, and
a DC power source,
said first transistor having its emitter connected to ground through said DC power source, having its base connected to the collector of said second transistor through said resistor, and having its collector connected to one of the terminals of said current regulator diode,
said second transistor having its emitter connected to ground, and having its base connected to said external control source, and
said current regulator diode being connected at the other terminal thereof to said control gate common line connected to the cathode gates of said PNPN switches.

9. A gate triggering circuit device for a plurality of speech path switches using PNPN switches as switching elements comprising a semiconductor integrated circuit device formed into the same semiconductor substrate forming said PNPN switches, and including one transistor,
one resistor, and
two PN junctions,
in which the emitter of said transistor is connected to one end of said resistor and said two PN junctions are connected in series between another end of said resistor and the base of said transistor, and wherein
the other end of said resistor, the base terminal and the collector terminal of said transistor are used as a terminal for connecting a DC power source, a terminal for connecting an external control signal, and a terminal for connecting a control gate terminal of said PNPN switches, respectively.

10. A gate triggering circuit device for a plurality of speech path switches claimed in claim 9, wherein two diodes are used for said PN junctions.

11. A gate triggering circuit device for a plurality of speech path switches using PNPN switches as switching elements comprising a semiconductor integrated circuit device formed into the same semiconductor substrate forming said PNPN switches, and including
two transistors,
one resistor and
two diodes,
said two transistors being composed of a first transistor and a second transistor,
in which said first and second transistors are connected to constitute a Darlington circuit, an emitter terminal of said Darlington circuit being connected to one end of said resistor, and a series circuit of said two diodes is connected between other end of said resistor and a base terminal of said Darlington circuit, and wherein
the other end of said resistor, the base terminal of said Darlington and a collector terminal of said Darlington are used as a terminal for connecting a DC power source, a terminal for connecting a control gate terminal of said PNPN switches, respectively.

12. A gate triggering method for a speech path switch which selectively connects $m$ incoming lines with $n$ outgoing lines and in which $m \times n$ PNPN switches effectively operating as thyristors and acting as switching elements are provided in a matrix form, $n$ PNPN switches constituting each row of the PNPN switch matrix are connected at the anodes thereof in common to one of said $m$ incoming lines, respectively, $n \times m$ diodes are connected at cathodes thereof with cathode gates of the respective PNPN switches, $n \times m$ misfire preventing resistors are provided between the cathode and cathode gate of the respective PNPN switches, and anodes of $n$ diodes whose cathodes are connected with the cathode gates of $n$ PNPN switches constituting one row of the matrix are connected in common to a control gate common line, so that the respective rows of the PNPN switches have their own one of the control gate common lines, respectively,
said method comprising the steps of:
a. connecting each of the control gate common lines to a constant-current regulated power source, respectively;
b. supplylying a DC voltage between one incoming line and one outgoing line where a speech path is to be formed therebetween; and then
c. triggering the constant-current regulated power source to which said one incoming line is connected, so that said constant-current regulated power source supplies a constant current to the cathode gate of one PNPN switch positioned at a crosspoint between said incoming line and outgoing line as well as the misfire preventing resistor for said one PNPN switch, said constant current being large enough to produce across said resistor a voltage drop exceeding the forward saturation voltage of a PN junction between the cathode and the cathode gate of said one PNPN switch.

13. A gate triggering circuit for a plurality of speech path switches being multistage connected, each speech path switch of one stage using $m \times n$ PNPN switches as switching elements in which $1 \times n$ PNPN switches constituting each row of PNPN switch arrays are connected in common at the anode thereof, comprising
means for connecting each of said $1 \times n$ PNPN switches constituting each row of said arrays in multiple at the cathode gate thereof to substantially a single control gate common line through respective diodes, and
a plurality of single constant-current regulated power supplies each connected to each said control gate common line, respectively, each constant-current regulated power supply being capable of switching the output current thereof by being controlled by an external control source.

* * * * *